US010049222B1

(12) United States Patent
Allen

(10) Patent No.: US 10,049,222 B1
(45) Date of Patent: Aug. 14, 2018

(54) ESTABLISHING APPLICATION TRUST LEVELS USING TAINT PROPAGATION

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/494,486

(22) Filed: Sep. 23, 2014

(51) Int. Cl.
*G06F 21/62* (2013.01)
*G06F 21/60* (2013.01)
*H04L 29/06* (2006.01)

(52) U.S. Cl.
CPC ............ *G06F 21/62* (2013.01); *G06F 21/60* (2013.01); *G06F 21/6245* (2013.01); *H04L 63/04* (2013.01)

(58) Field of Classification Search
None
See application file for complete search history.

(56) References Cited

U.S. PATENT DOCUMENTS 5,850,443 A * 12/1998 Van Oorschot et al. ..... 380/285
8,181,250 B2 * 5/2012 Rafalovich et al. ............ 726/23
8,365,291 B1 * 1/2013 Le ........................... G06F 8/433
                                                          726/25
8,671,455 B1 * 3/2014 Zhu et al. ....................... 726/26
2010/0058479 A1 * 3/2010 Chen et al. ..................... 726/26
2011/0047597 A1 * 2/2011 Mahaffey et al. ................ 726/3
2011/0107434 A1 * 5/2011 Chow et al. ................... 726/28
2012/0222083 A1 * 8/2012 Vaha-Sipila .......... H04L 63/102
                                                         726/1
2013/0097203 A1 * 4/2013 Bhattacharjee ....... G06F 21/604
                                                      707/783

OTHER PUBLICATIONS

Zhu, "TaintEraser: Protecting Sensitive Data Leaks Using Application-Level Taint Tracking", 2011, pp. 142-153.*

* cited by examiner

*Primary Examiner* — Benjamin E Lanier
(74) *Attorney, Agent, or Firm* — Lowenstein Sandler LLP

(57) ABSTRACT

An application of a mobile device may be granted access to sensitive or private information. The mobile device may be configured to monitor the application's use of any sensitive data obtained by the application. The mobile device may cloak the sensitive data before providing the data to the application in response to a request. Furthermore, the cloak sensitive data may include taint propagation data configured to enable the mobile device to detect that application's use of the cloaked sensitive data. As a result of detecting the application use of the cloaked sensitive data, a privacy database may be updated to include the applications use of the cloaked sensitive data.

18 Claims, 9 Drawing Sheets

ESTABLISHING APPLICATION TRUST LEVELS USING TAINT PROPAGATION

CROSS REFERENCE TO RELATED APPLICATION

This application incorporates by reference for all purposes the full disclosure of co-pending U.S. patent application Ser. No. 14/494,336, filed concurrently herewith, entitled "ESTABLISHING APPLICATION TRUST LEVELS USING TAINT PROPAGATION AS A SERVICE".

BACKGROUND

Software development, including mobile application development, has greatly increased in recent years. Organizations increasingly develop multiple applications in order to support a variety of different hardware platforms with different capabilities and features. These applications may be granted access to user information that may be considered sensitive or private. This sensitive or private information may be inadvertently or purposely transmitted to third parties. Additionally, the application may not be configured to ensure the security of this sensitive or private information. Furthermore, the user may be unaware of an application's potential security threat or may be willing to expose sensitive or private information in order to obtain the functionality offered by the application.

BRIEF DESCRIPTION OF THE DRAWINGS

Various embodiments in accordance with the present disclosure will be described with reference to the drawings, in which.

DETAILED DESCRIPTION

Figure 1:
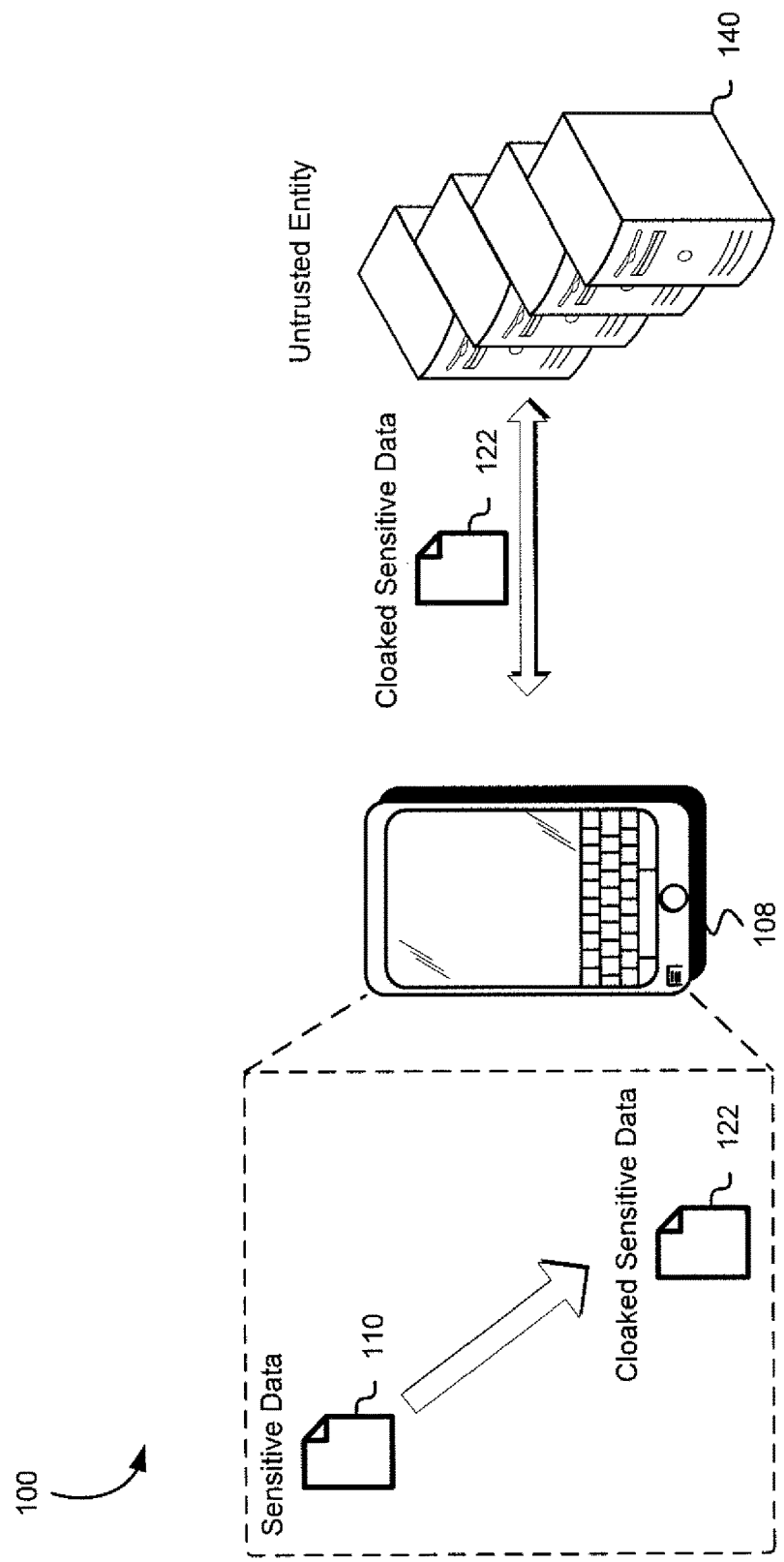
FIG. 1 shows an illustrative example of a device exposing sensitive data to an untrusted entity in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested relate to improvements in application security for mobile devices or other devices containing sensitive or private information. Applications on mobile devices may require access to various components of the mobile device's hardware, memory, and other application executed by the mobile device. The required access may include access to sensitive data and other types of data the user may not want disclosed to other entities. For example, the application may require access to the mobile device's camera, microphone, or contact list. The application may transmit sensitive data to other entities such as other mobile device users, service providers, and advertisers. The application may request permission to access the various components of the mobile device from the user as a requirement to install and execute the application on the user's mobile device. Once permission is granted, the application may access sensitive data and other components of the mobile device and may not take adequate measures to ensure security of the data obtained.

In some embodiments, the mobile device is configured to cloak or otherwise obfuscate sensitive data requested by applications. Various applications may have an associated level of trust indicating whether to cloak data and if so what level of data cloaking should be applied. Cloaking the data may include reducing the fidelity of the data provided to the application while providing an amount of data sufficient for the application to function properly. For example, if the application requests the Global Positioning System (GPS) coordinates of the mobile device, the mobile device may cloak the data by reducing the accuracy of the coordinates to one mile. If the application has a lower level of trust the accuracy of the coordinates may be reduced to a metropolitan area. If the application has a high level of trust the accuracy of the data provided may be increased. As in the example above, if the application has the maximum level of trust the accuracy may be within 100 meters or may be provided without any reduction in fidelity. In some embodiments, if the application requests access to data associated with another application, such as a contact list application or messaging application, the mobile device may cloak the data by providing access to only a subset of data of the application. For example, if an application is requesting access to the contact list on the user's mobile device, the mobile device may only allow access to a subset of the contact list or may allow access to only a portion of the data for each entry in the contact list, such as first and last name but may not allow access to telephone number and physical address.

When an application requests access to another component of the mobile device or otherwise attempts to gain access to sensitive data, the mobile device or component thereof may request information from a privacy database indicating whether to cloak the data and what level of cloaking to apply to the data. The privacy database may contain a set of records, and each record may be configured to identify an application and indicate a trust level associated with the identified application. The records may include a variety of other information as well, such as information corresponding to the level of data cloaking to apply to data requested by the application, information indicating operations the application has previously performed with the sensitive data, security-related measures the application may take with sensitive data, or any other information suitable to establishing the level of trust of the application. The mobile device or component thereof may cloak the sensitive data requested by the application according to the information returned from the privacy database and provide the cloaked sensitive data to the application. In addition to providing the cloaked sensitive data, a code instrumentor may attach taint propagation data to the cloaked sensitive data. The taint propagation data may enable the mobile device to determine the operations the application performs on the cloaked sensitive data.

For example, at some point after being provided with the cloaked sensitive data the application may attempt to transmit the cloaked sensitive data to a third party using an input/output device connected to the mobile device. For example, the application may attempt to transmit the mobile device's GPS coordinates to a server using a radio connected to the mobile device. In another example, an application may attempt to upload information captured by a microphone or camera connected to the mobile device. The mobile device may monitor the application's use of the cloaked sensitive data by monitoring for the appearance of the taint propagation data. For example, the input/output device may maintain a buffer of data to be transmitted, and the mobile device or component thereof may monitor the buffer for taint propagation data. As a result of detecting taint propagation data in the buffer, the privacy database may be updated based at least in part on information contained in the taint propagation data. For example, the update may include information identifying the application responsible for transmitting the cloaked sensitive data, any transformation or obfuscation of the cloaked sensitive data performed by the application before it was transmitted, the number of instances the application transmitted cloaked sensitive data, the number of instances the application transmitted data that was not sensitive data, or other information capable of establishing the level of trust of the application. In various embodiments, the mobile device provides a mobile application service provider with information from the privacy database in order to correlate the application's activities across multiple devices and establish the trust level of the application.

FIG. 1 illustrates an example environment 100 where an application of a mobile device 108 may transmit or otherwise expose cloaked sensitive data 122 to an untrusted entity 140. The mobile device 108 may obtain an image of the application from an application store, an application developer, or other source. In various embodiments, the application may be provided with the mobile device. For example, the application may be included with the mobile device by the manufacture or the service provider associated with the mobile device. Execution of the application by the mobile device 108 may require an operating system of the mobile device 108 to provide the application access to various components of the mobile device, including other applications. The operating system of the mobile device 108 may control access these components by granting a set of permissions to the application, and the permission may enable the application to access various components of the mobile device 108. For example, the application may request one or more permissions to access the GPS circuitry, camera, and short range communications circuitry of the mobile device 108. The operating system of other software executed by the mobile device 108 may request authorization to grant the requested permission from the user of the mobile device 108. For example, the user may request to download an application from an application store, described in greater detail below, and as a result the user may be prompted to provide authorization to the application to access various components of the mobile device 108. In various embodiments, the grant of permissions is provisional and may be modified and/or revoked once a trust level of the application is established or if the application has an established trust level the permissions may be modified and/or revoked if the trust level falls below a certain level. Additionally, the permission may indicated one or more prohibited operations that the application should not perform utilizing the sensitive data.

Providing the requested permissions to the application may enable the application to access sensitive data 110. Sensitive data 110 may be data indicated as sensitive by an operating system of the mobile device. Sensitive data 110 may also include data that requires at least one permission to access. In some embodiments, the sensitive data is required in order to enable proper functionality of the application. For example, the application may be a navigation application requiring access to the mobile device's 108 GPS circuitry in order to provide accurate navigational information. In another example, a social networking application may request permission to access contact information stored on the mobile device which may not be necessary for the social networking application to function properly. Once access is granted to the application, the application may obtain sensitive data 110 and store the sensitive data 110 in application memory. In some embodiments, the application may transform the sensitive data 110 such that the risk of exposing sensitive or private information in reduce or mitigated. For example, the application may encrypt or otherwise obfuscate the sensitive data 110 stored in application memory.

As described in greater detail below, the mobile device may be configured to cloak or otherwise protect sensitive data 110 before providing the sensitive data 110 to the application. The operating system of the mobile device 108 may be configured to cloak the sensitive data 110 in order to generate cloaked sensitive data 122. The cloaked sensitive data 122 may be generated by approximating the sensitive data 110. In some embodiments, the cloaked sensitive data 122 may be generated by reducing the fidelity of the sensitive data 110. For example, an application may obtain a recording of the environment of the mobile device 108 using a microphone or other recording device connected to the mobile device 108. Recording captured by the microphone may be indicated as sensitive data 110 by the operating system of the mobile device 108, as a result the recording may be alter in order to generate cloaked sensitive data 122. For example, the quality of the recording may be reduced or noise may be added to the recording in order to reduce the fidelity of the recording. The application may then be provided with the cloaked sensitive data 122 and transmit the cloaked sensitive data 122 to the untrusted entity 140 as a result of an operation of the application. Cloaking the sensitive data 110 may reduce the amount of private information disclosed to the untrusted entity 140 by applications executed by the mobile device 108.

Figure 2:
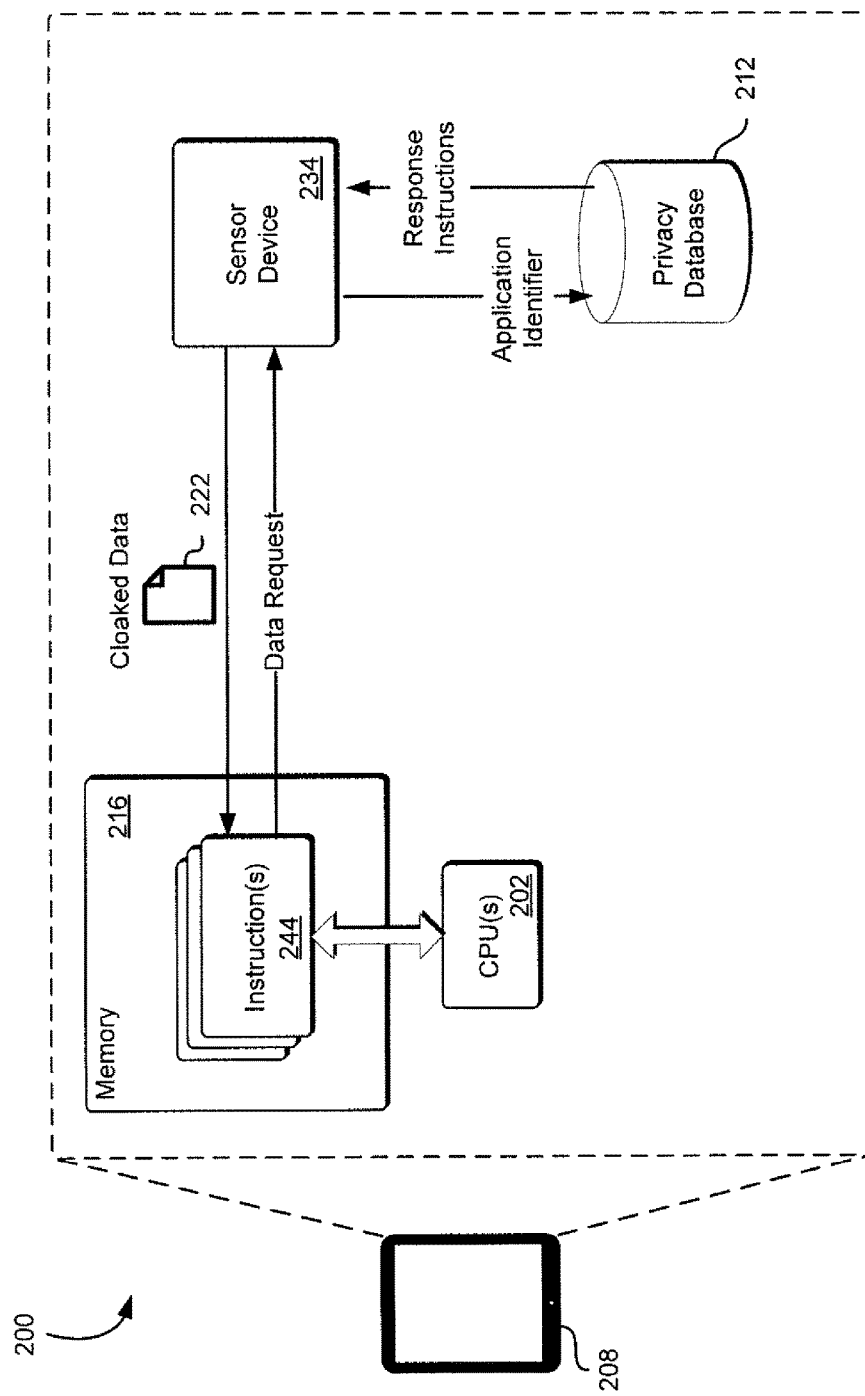
FIG. 2 shows an illustrative example of a device cloaking sensitive data in accordance with at least one embodiment.

Accordingly, FIG. 2 illustrates an example environment 200 where sensitive data may be cloaked in order to protect the sensitive data from being exposed to third parties. A mobile device 208 may contain one or more executable application instructions 244 which may be loaded into memory 216 of the mobile device 208. The one or more executable application instructions 244 may be obtained from an application image and may, when executed by one or more central processing units (CPUs) 202 of the mobile device, cause the mobile device to perform various operations of the application. The memory 216 may also contain other executable instructions for various other applications including operating system executable instructions. The application, not shown in FIG. 2 for simplicity, may be obtained as described above and may be granted one or more permissions to access various components of the mobile device, such as a sensor device 234. The sensor device 234, described in greater detail below, may be any device capable of obtaining information corresponding to a state of the mobile device environment. For example, the sensor device 234 may include GPS circuitry, microphone, cameras, infrared sensors, and accelerometers. The mobile device 208 may be any suitable computer system such as the computer system described below in connection with FIG. 8.

An operating system of the mobile device may cause the instructions 244 to be loaded into memory 216 as a result of an input received from the user of the mobile device 208. For example, the user may select an icon displayed on a touchscreen of the mobile device 208 associated with the application. This may cause the executable instructions 244 associated with the application to be loaded into memory 216 and executed by the CPU 202. At some point during the execution of the application, the executable instructions 244 may cause the CPU to generate a request for data from the sensor device 234. The data obtained or otherwise generated by the sensor device 234 may be sensitive data as described above. In some embodiments, the operating system of the mobile device 208 is configured with information indicating data which is sensitive data and other data which is not sensitive. For example, the operating system may enable a user to select data and component of the mobile device 208, such as a camera, which are sensitive and therefore should be cloaked or otherwise protected from applications with a low level of trust. In another example, the mobile device 208 may be configured such that any attempt to access data outside of an application causes the mobile device to cloak the requested data.

The sensor device 234 may receive the data request from the application as a result of the CPU 202 executing the executable instructions contained in memory 216. The request may be transmitted over a system bus or other communications device as described in greater detail below. As a result of receiving the data request, the sensor device 234 may obtain information from a privacy database 212. In various embodiments, the operating system or other software executing on the mobile device 208 may perform the functions of the various components of the mobile device 208 described herein. For example, the operating system of the mobile device 208 may be configured to query the privacy database 212 on behalf of the sensor device 234 and determine whether to cloak the requested data before returning the requested data. Returning to FIG. 2, the privacy database 212 may be any data structure configured to maintain information corresponding to a trust level associated with an application. For example, the privacy database 212 may organize records using an identifier of a particular application where the records include a trust level of the particular application and at least some history of the particular application's use of sensitive data, such as whether the particular application has transmitted sensitive data to a third party. Furthermore, the mobile device or component thereof, such as the privacy database, may periodically or aperiodically adjust the trust level associated with an application based at least in part on the history of the application indicated by the privacy database. For example, if the privacy database indicated that the application has not exposed sensitive data since the application was last updated, the privacy database may increase the level of trust associated with the application.

As illustrated in FIG. 2, the sensor device 234 may query the privacy database 212, and the query may include the application identifier or any other information required to determine the trust level of the application requesting the data or a level of cloaking to apply to the requested data. The privacy database 212 may respond to the query with response instructions, and the response instructions may include a variety of different information. For example, the response instructions may include the trust level of the application if one exists. In another example, the response instructions may include a level of cloaking to apply to the requested data. The sensor device 234 may then cloak the requested data as indicated in the response instructions obtained from the privacy database 212. As described above, cloaking the requested data to generate cloaked data may include a variety of operations resulting in at least some reduction in fidelity of the data obtained and/or generated by the sensor device 234. For example, the sensor device 234 may provide only a portion of the data requested, such as the least significant bits of the requested data or the most significant bits of the requested data. In some embodiments, another component of the mobile device 208 may generate the cloaked data 222 before providing the cloaked data 222 to the requesting application. For example, the operating system of the mobile device 208 may transform or otherwise alter the requested data obtained from the sensor device 234 before providing the cloaked data 222 to the requesting application. The cloaked data 222 may be an approximation of the data requested by the application. In some embodiments, the data request is directed at another application, such as the contact list described above. Similarly, applications my query the privacy database 212 and generated cloaked data 222 as described herein.

As shown in FIG. 2, the mobile device 208 includes at least the memory 216 and one or more processors 202. The mobile device 208 may include one or more processors of a variety of different processors, such as CPUs or graphics processing units (GPUs), that provide computing functionality to the testing device. Examples of processors include those utilizing a complex instruction set computing (CISC) architecture, such as the x86 CPU, and others that utilize a reduced instruction set computing (RISC) architecture, such as the advanced RISC machine (ARM) CPU. The mobile device 208 may include additional hardware not illustrated in FIG. 2 for simplicity. The data stored in the memory 216 (programs, code modules, instructions) that, when executed by one or more processors 202, may provide the functionality of one or more embodiments of the present disclosure. These application modules or instructions may be executed by the processors 202. The memory 216 may additionally provide storage for other software of the mobile device 208 such as an operating system and applications. For example, the memory 216 may provide storage for the cloaked data 222 requested by the application. The memory 216 may include random access memory, read only memory, static memory, dynamic memory or any other storage mechanism suitable for storing executable code.

The mobile device 208 may further include a network interface configured to communicate using any type of communication protocol, including a cellular wireless communications protocol, such as fourth generation (4G) communications or long term evolution (LTE (RTM)), a wireless local area network (WLAN) communications protocol, such as an Institute for Electrical and Electronics Engineers (IEEE) 802.11, 802.16 or 802.21 communication protocol, or short range communications protocol, among others. The executable instructions 244 may cause the network interface to transmit cloaked data 222 to one or more other entities, described in greater detail below. The mobile device 208 may further be equipped with a GPS circuitry that enables locating the device.

Figure 3:
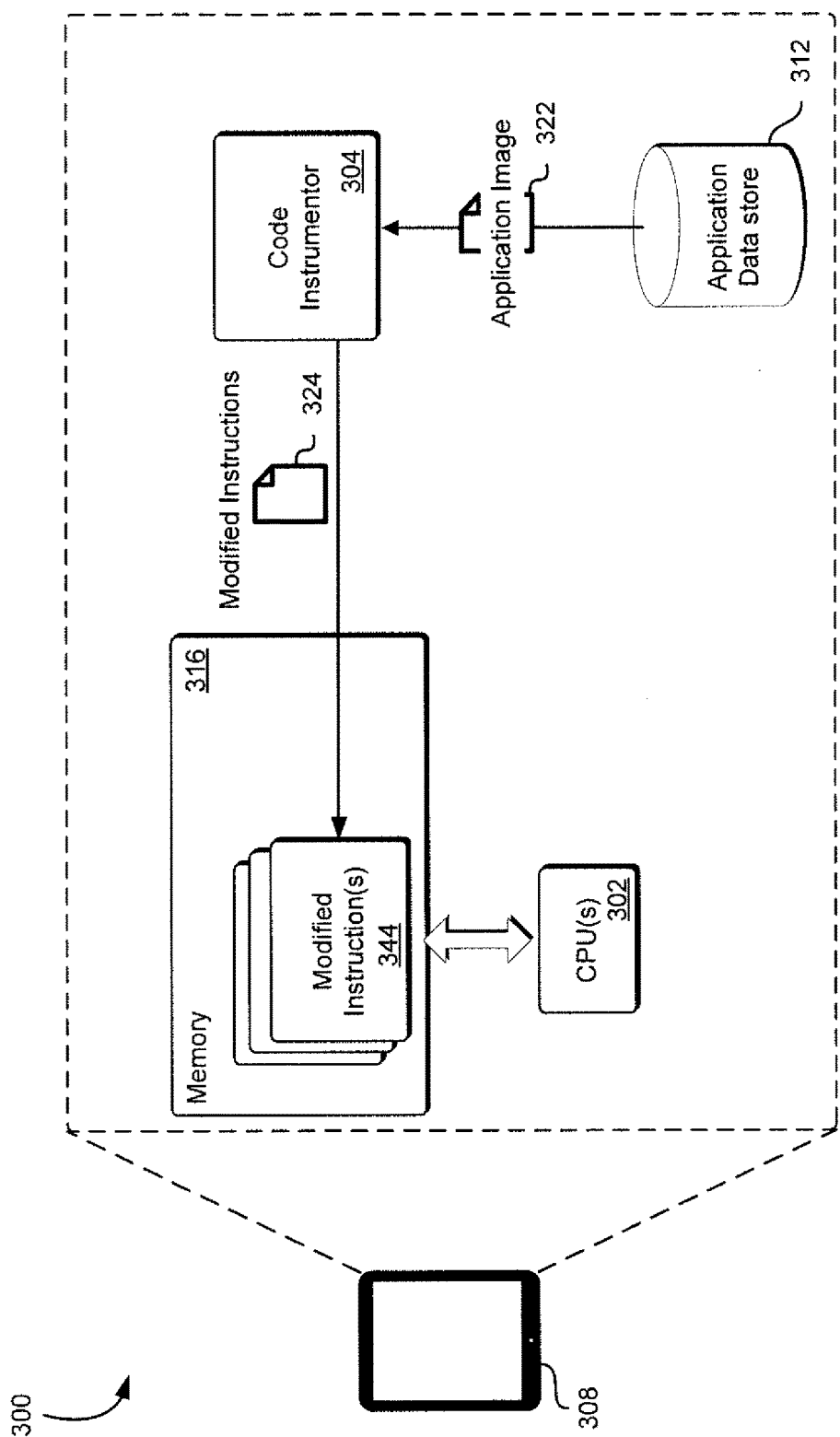
FIG. 3 shows an illustrative example of taint propagation of sensitive data in accordance with at least one embodiment.

FIG. 3 illustrates an example environment 300 where taint propagation information may be associated with cloaked data as described above in order to track an application's use of sensitive data by at least modifying the application's executable instructions. A mobile device 308 may be hardware and software as described above. The mobile device 308 may include a plurality of application images 322 in an application data store 312. An application data store 312 may be part of the mobile device's memory subsystem described in greater detail below. The application data store 312 may also include one or more storage devices, such as disk drives, optical storage devices and solid-state storage devices, as well as removable media devices, memory cards, flash cards, etc. The application images 322 may be a data structure or other package containing the executable instructions of the application.

Furthermore, during execution of the application executable instructions may be modified by a code instrumentor 304 and modified instructions 344 may be loaded into memory 316 and executed by one or more processors 302 of the mobile device 302. Executing the executable instructions 344 by the CPU 302 may generate a request for sensitive data which may be cloaked as described above in connection with FIG. 2. The code instrumentor 304 by modifying the applications executable instructions may cause the CPU 302 or other componenet of the mobile device 308 to insert taint data into the cloaked data. The code instrumentor 304 may be a trusted application or portion of an application executed by the mobile device 308. For example, the code instrumentor 304 may be a function of the operating system of the mobile device 308.

The code imstrumentor 304 may modify the application's executable instructions every time the application is loaded into memory or only the first time the application is loaded in to memory. In some embodiments, the application's executable instructions may be modified once the application is initially obtained by the mobile device 308. For example, the mobile device 308 may obtain the application image 322 from a mobile application store, upon receipt of the application image 322 by the mobile device 308 the code instrumentor 304 may modify the application executable instructions before storing the application image in the application data store 312. In another embodiment, the obtained application image 322 may contain modified or partially modified instructions. For example, the mobile application store described above may modify the instructions of the application before transmitting the application image 322 to the mobile device 308. The code instrumentor 304 may then determine if the executable instructions contained in the application image 322 have been modified and modify any executable instructions that need modification in order to insert taint information into sensitive data.

The code instrumentor 304 may modify the executable instructions 344 associated with the application in order to add taint propagation information. Modifying the executable instructions 344 may enable the mobile device or component thereof to determine if the application accesses or otherwise utilizes the cloaked sensitive data received from the sensor device 334 or other protected component of the mobile device 308. Modifying the executable instructions 344 may cause the taint data to be propagated with the sensitive data. Furthermore, taint propagation data may be associated with the cloaked sensitive data that was returned from the sensor device or other protected component of the mobile device 308. For example, the modified instructions 344 generated by the code instrumentor 304 may cause the CPU 302 to add the taint data to the data structure in application memory containing the cloaked sensitive data. In another example, the modified instructions may cause the sensor device or other protected component of the mobile device 308 to insert taint data along with the cloaked sensitive data in response to request for sensitive data by the application. In yet another example, the CPU 302 may unpack cloaked sensitive data transmitted by the sensor device or other protected component of the mobile device 308 and insert taint data as a result of the modified instructions 344. The modified executable instructions 344 may cause the taint data to be copied when the cloaked sensitive data associated with the taint data 322 is copied, modified, or otherwise interacted with as a result of an operation of the application. The modified instructions 344 may tag the cloaked sensitive data returned from the sensor device with the taint data such that the mobile device 308 or component thereof may monitor the utilization of sensitive data. Furthermore, by modifying the application's executable code, the application does not need to be configured to utilize taint propagation information and may be unable to detect alteration of the executable instructions.

In some embodiments, the taint data may be appended to the cloaked sensitive data store in application memory. The mobile device 308 or operating system of the mobile device 308 may be configured to allocate additional space for the cloaked sensitive data in application memory. The additional space may be fixed at the time the data is written to application memory or may be dynamically allocated. The taint data may provide information corresponding to the application requesting the sensitive data, the operations of the application on the sensitive data, and the flow of the sensitive data between applications and computing devices. Furthermore, the taint data may include multiple tags, and each tag may indicate a portion of the information represented by the taint data. For example, a particular tag may contain 32 bits of information and the taint data may contain 4 tags. The 4 tags may be included in the cloaked sensitive data stored in application memory. When the modified executable instructions 344 access the cloaked sensitive data the taint data is copied and included in any data the modified executable instructions 344 cause the CPU 302 to write. As described below in connection with FIG. 4, this may include providing the cloaked sensitive data to an output device.

Figure 4:
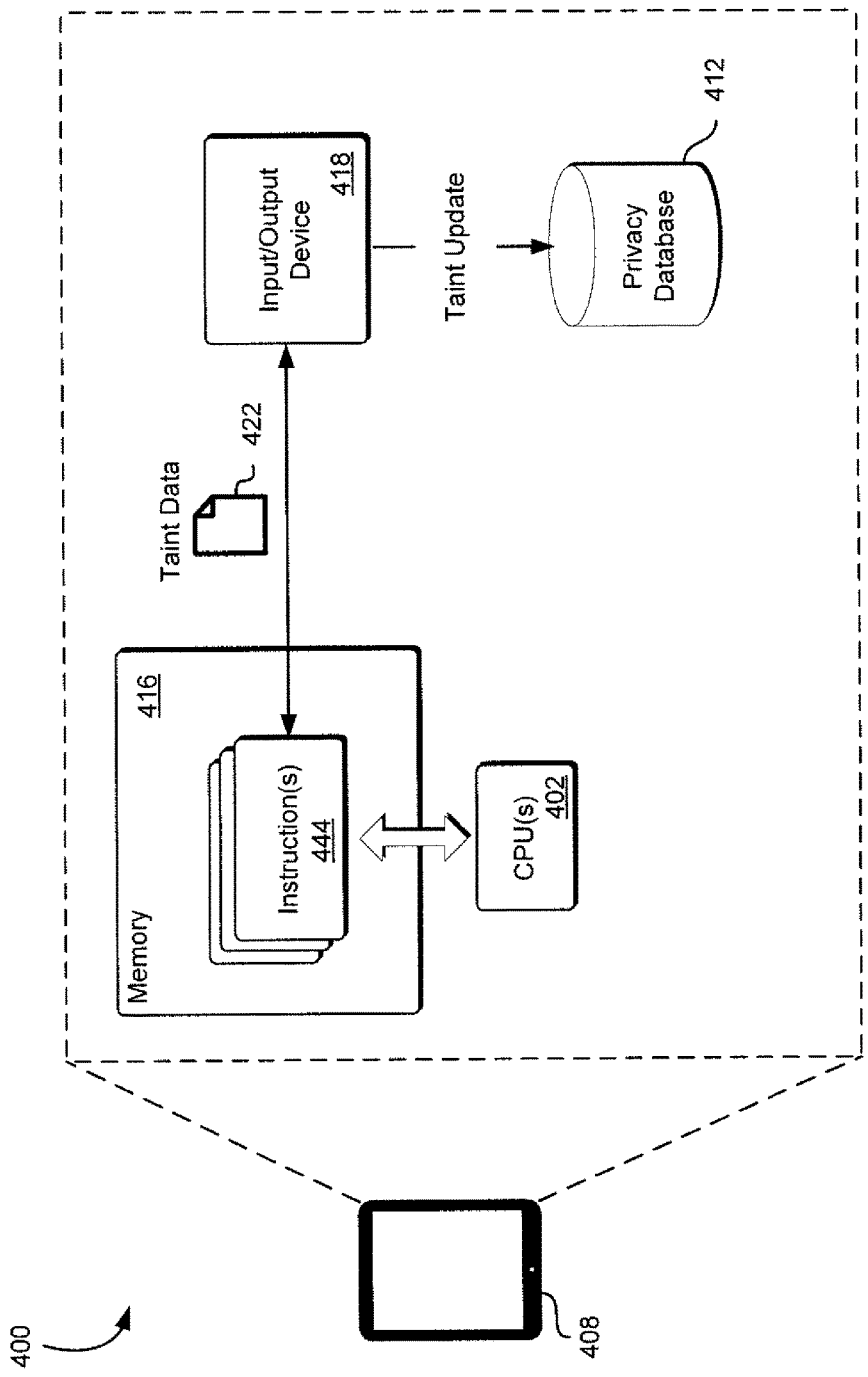
FIG. 4 shows an illustrative example of a privacy database in accordance with at least one embodiment.

Accordingly, FIG. 4 illustrates an example environment 400 where a privacy database 412 may be updated based on whether taint data 422 associated with an application is received by another component of a mobile device 408. The mobile device 408 may be any mobile device described herein, including the devices described above in connection with FIGS. 2 and 3. As described above, cloaked sensitive data may be associated with taint data 422. Furthermore, modified executable instructions 444 may cause the taint data 422 to be included in any operation performed on the cloaked sensitive data. As illustrated in FIG. 4, the modified executable instructions 444 may determine that the cloaked sensitive data has been provided to an input/output device 418, as a result of an operation of the application, and cause the taint data 422 to be propagated to the privacy database. The taint data 422 may be associated with the cloaked sensitive data but may be inaccessible to the application. The input/output device 418 may be a component of the mobile device such as a network interface, radio, or other component described herein capable of sending and receiving data. The application may cause the taint data 422 to be transmitted to the input/output device 418 as a result of the application transmitting the cloaked sensitive data to another application. In various embodiments, the other application is another computing device such as a server or other mobile device.

The input/output device 418 may be configured to maintain a buffer of data received and transmitted by the input/output device 418. Furthermore, the input/output device 418 may be configured to monitor the buffer for taint data 422. In various embodiments, the mobile device or component thereof such as the operating system is configured to monitor data provided to the input/output device 418 for taint data. Returning to FIG. 4, the input/output device 418 may provide the privacy database 412 with updates corresponding to data received by the input/output device. The updates to the privacy database 412 may include a variety of different information configured to establish a trust level of an application. For example, if the input/output device 418 receives the taint data, the input/output device 418 may provide the taint data 422 to the privacy database 412.

The privacy database 412 may then determine an application corresponding to the taint data 422 and update a record associated with the application. The update may indicate an operation that the application performed with the cloaked sensitive data associated with the taint data. For example, an application may obtain GPS coordinates which the code instrumentor may associate with taint data 422, and the application may then transmit the GPS coordinates to an untrusted third party using a network interface of the mobile device. The network interface may then update the privacy database 412 with information corresponding to the application's use of the GPS coordinates. In some embodiments, the input/output device 418 may determine if the application associated with the taint data 422 has modified the cloaked sensitive data. Returning to the example above, the network interface may determine if the application has modified the GPS coordinate in order to protect the user's sensitive information. This information may be provided to the privacy database 412. In another embodiment, the input/output device 418 may determine that the application has not attempted to share the sensitive cloaked data with a third party and may provide that information to the privacy database 412. The privacy database may provide periodic or aperiodic updates to a service provider as described below in connection with FIG. 6. The service provider may be responsible for determining a trust level associated with applications and distributing trust information to multiple devices.

Figure 5:
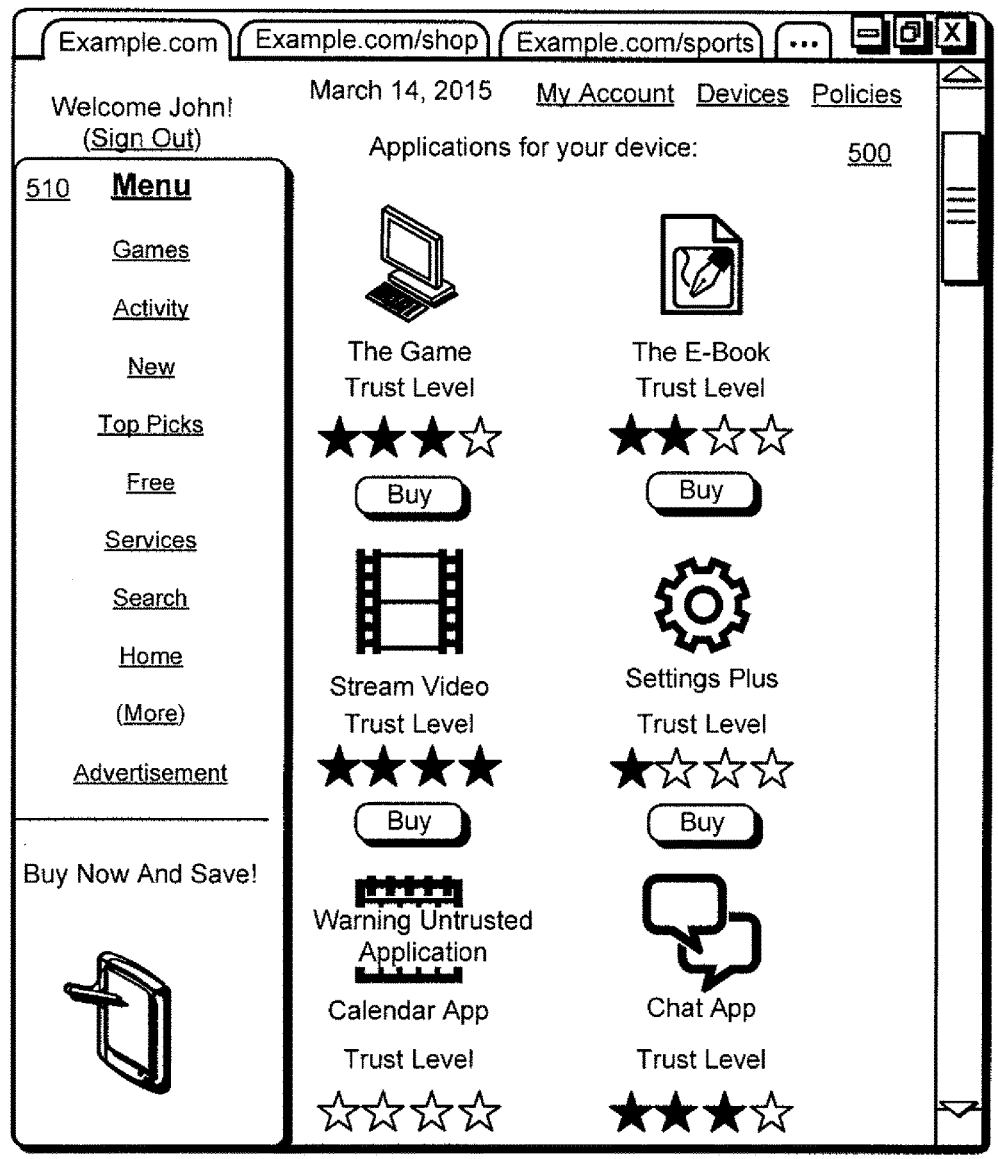
FIG. 5 is an illustrative example of a webpage for establishing a trust level of applications in accordance with at least one embodiment.

FIG. 5 shows a webpage 500 which may be displayed by an application executed by a mobile device enabling a user to purchase or otherwise obtain one or more applications, where the one or more applications are assigned a trust level corresponding to the application's use of sensitive data maintained by the user's mobile device. As illustrated in FIG. 5, the webpage 500 includes various graphical user interface elements that enable navigation throughout a mobile application store of which the webpage 500 is a part. In various embodiments, the webpage 500 is implemented by a service provider and the service provider is responsible for receiving user input into the webpage 500 and transmitting the received input to various other services of the service provider configured to provide the application and associated trust information to the mobile device. For example, as described in greater detail below, the user's input may cause the service provider to enable the user's mobile device to access an application in order to install the application on the mobile device. The webpage 500 may be displayed by various applications, such as a mobile application or web browser. In this example, the webpage 500 includes various navigational features. For instance, on the left-hand side of the webpage 500, various links 510 may link to one or more other webpages that contain additional content corresponding to the application store. In this example, the links appear as textual words which enable the links to be selected using an appropriate input device such as a keyboard, mouse, touchscreen or other input device. Selection of one of the links 510 may cause an application displaying the webpage 500 to submit, pursuant to a uniform resource locator (URL) associated with the selected link by the programming of the webpage 500, an HTTP request for the content associated with the link a server that provided the webpage 500 or another server. In this example, the webpage 500 also includes a graphical user element configured as a "buy" button. The buy button may be a graphical user interface element of the webpage 500 where the underlying code of the webpage 500 is configured such that selection by an input device of the buy button causes information corresponding to the selection to be transmitted to one or more servers of the service provider.

The webpage 500 may also include a description of the applications and/or other information associated with the applications displayed in webpage 500. The description may provide information to the customer, including a particular level of trust associated with the application. New applications or applications without an associated trust level may be provided with a default level of trust. Furthermore, applications that have a level of trust below a certain amount may be provided with a warning or the service provider may prevent the applications from being downloaded as a result of user input. For example, a particular application may provide sensitive data to untrusted entities as indicated by taint propagation information provided by one or more mobile devices. As a result, the service provider may prevent users from obtaining the application and provide the developer with information indicating the behavior of the application. The developer of the application may then update the application such that the application no longer exposes sensitive data to untrusted entities. In this example, the webpage 500 contains six applications that the customer may download and/or install to the customer's mobile device. The application may be provided by a developer, by the service provider, or any other party capable of posting applications to the webpage 500.

Furthermore, the applications displayed in the webpage 500 may correspond to services offered by the service provider or one or more other organizations. For example, the services may include a messaging, delivery service or other service. The applications displayed on the webpage 500 may contain a presentation of the application such as a graphical representation of the service or operation associated with the application, which could be text and/or a drawing, photograph, description, identification number, trademark, video clip, audio clip or any other representation capable of representing the items. Other variations of the user interface displayed in FIG. 5 may be used in accordance with the present disclosure. For example, drop-down menus may be included in the user interface to enable the user to select a particular user account or information associated with a customer account to include when provisioning new mobile devices.

Figure 6:
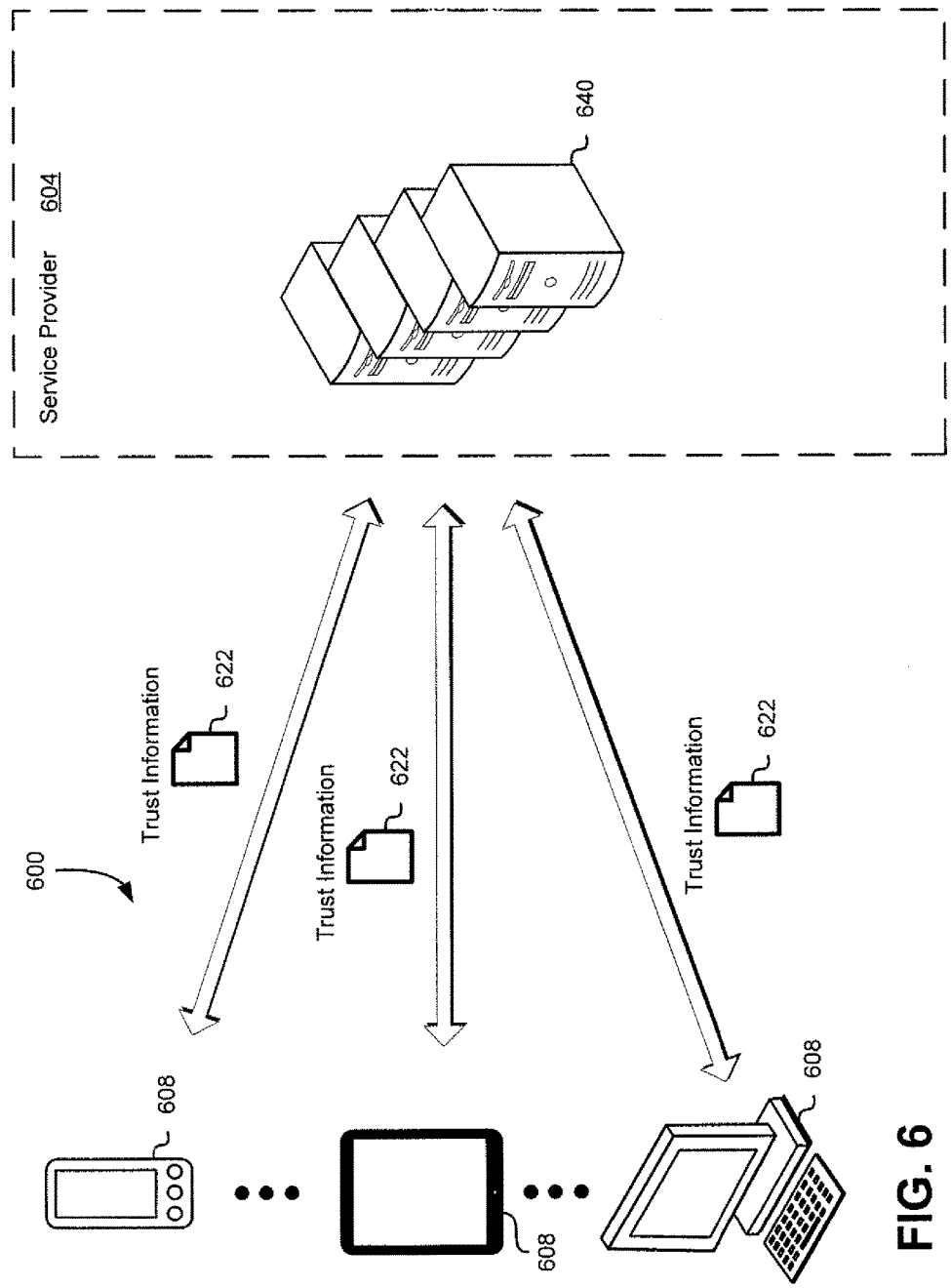
FIG. 6 is an illustrative example of devices sharing trust information with a service provider in accordance with at least one embodiment.

FIG. 6 illustrates an example environment 600 where one or more computing devices 608 may provide trust information 622 to a service provider 604. The service provider may operate a trust service 640 responsible for aggregating and/or analyzing trust information received from the one or more computing devices 608. The trust service 640 may be part of another service offered by the service provider 604. For example, the service provider 604 may for an application store service configured to enable user to select applications to download and install to the one or more computing device, such as the application store illustrated in FIG. 5. The trust service 640 may be part of the application store and provide trust information associated with applications available for download from the application store. The trust service 640 may be a computer system or virtual computer system configured to provide a trust level associated with an application, the trust level determined based at least in part on trust information 622 received from the one or more computing devices 608.

The trust information 622 may include a variety of different information obtained by the one or more computing devices 608 as described above. For example, the trust information 622 may include all or a portion of the records contained in the privacy database. The records may include an identifier of an application, where the identifier is capable of uniquely identifying an application within the service provider environment, including the trust service 640 and other services offered by the service provider 604 such as the application store described above. Furthermore, the trust information 622 may include taint propagation information for applications of the particular computing device providing the trust information 622. The trust information may also include cloaking information about an application of the particular computing device providing the trust information.

The taint propagation information and the cloaking information may indicate the applications utilization of sensitive data and any mitigation operations the computing device performed to reduce the fidelity of the sensitive data. This information may be used by the service provider to determine a level of trust associated with the application as well as a cloaking level that may be applied to sensitive data requested by the application. In various embodiments, the service provider 604 or component thereof, such as the trust service 640, may determine a minimum amount of data fidelity required in order for a particular application to maintain proper functionality. For example, the trust service 640 may determine, based at least in part on the cloaking information provided by the one or more computing device 608 in the trust information 622, the maximum amount of cloaking of GPS coordinates that may be performed while still allowing the application to function. Specifically, the GPS coordinates may be cloaked by selecting a radius of a certain size from the GPS coordinates and selecting a random location within that radius. The service provider may then determine the maximum size of the radius that may be used to cloak the data while enabling the application to still function properly.

The service provider 604 or trust service 640 may provide aggregated and/or analyzed trust information 622 to the one or more computing devices 608. For example, the aggregated and/or analyzed trust information may be provided as part of the application's display in the application store as described above. In another example, the one or more computing devices may subscribe to updates from the trust service 640 and may receive updates to records corresponding to application identifiers contained in the particular computer systems privacy database. The update may include a trust level associated with the application or observed behaviors of the application including the application's use of sensitive data as indicated by taint propagation information. In various embodiments, the computing device may be a desktop or similar personal computing device and the application may be a plug-in capable of causing information to be transmitted to a third party. The cloaking and taint propagation operations for the personal computing device may be performed as described above in connection with a mobile device.

Figure 7:
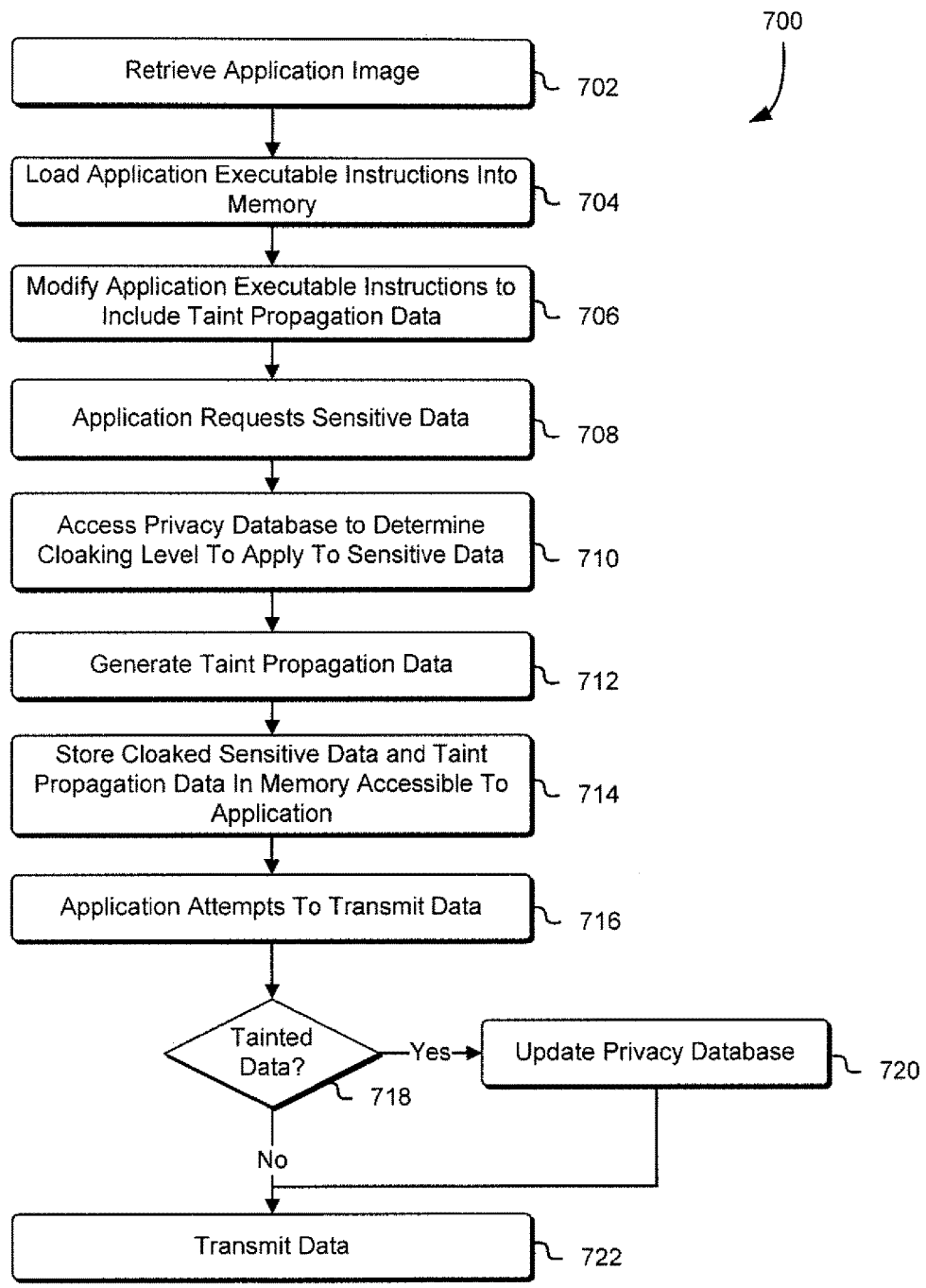
FIG. 7 is an illustrative example of a process for establishing application trust using taint propagation in accordance with at least one embodiment.

FIG. 7 shows an illustrative example of the process 700 which may be used to establish a level of trust associated with an application of a mobile device. The process 700 may be performed by any suitable system such as the mobile device described above in connection with FIGS. 2 through 4. Returning to FIG. 7, in an embodiment, the process 700 includes retrieving an application image 702. The mobile device may request the application image from an application store as described above. In numerous variations, the process 700 the application image may include information indicating a trust level of the application or information indicating historical usage of sensitive by the application. The mobile device may, at some point in time after retrieving the application image, load the application's executable instructions into memory of the mobile device 704. For example, an operating system of the mobile device may load the application's executable instructions into memory as a result of receiving user input from an input device connected to the mobile device. One or more processors of the mobile device may execute the executable instructions loaded into memory in order to perform various operations of the application. The mobile device or component thereof may cause the application executable instructions to be modified 706 such that taint propagation data is associated with cloaked sensitive data in a single data structure. As described above, the modified executable instructions may cause the CPU or other component of the mobile device, such as a sensor device, to include taint propagation information along with sensitive data or cloaked sensitive data. Returning to FIG. 7, the application's executable instructions may be modified such that when the application attempts to perform an operation using the sensitive data the taint data is include in the operation such that the application use of the sensitive data may be tracked and/or monitored.

During performance of the various operations of the application, the application may request sensitive data 708. For example, the application may request access to a set of credential the user caused to be stored on the mobile device. In another example, the application may request access to message or e-mails stored on the mobile device. As a result of the request from sensitive data, the component of the mobile device receiving the request may access the privacy database to determine a cloaking level to apply to the sensitive data 710. The privacy database may return a trust level of the application requesting the data and the trust level may indicate a cloaking level to apply to the data. In another embodiments, the privacy database may return a cloaking level to apply to the sensitive data. For example, as described above, the privacy database may return a radius from the GPS coordinated of the mobile device from which a random location is to be selected and provided in return to the request from sensitive data.

The mobile device after cloaking the sensitive data to the indicated level may return the cloaked sensitive data. In numerous variations to process 700, the mobile device may cause the modification of the applications executable instructions and then store the cloaked sensitive data in a memory location accessible to the application. Returning to FIG. 7, the mobile device may generate taint propagation data 712. As described above, the modified executable instructions of the application may cause the mobile device to generate the taint propagation data so that the application use of sensitive data may be tracked by the mobile device. Generating the taint propagation data may be done after the sensitive data is cloaked or may be generated along with the cloaked sensitive data. The cloaked sensitive data may then be stored along with the taint data in memory accessible to the application 714. For example the taint data may be appended to the cloaked sensitive data as described above.

At some point in time after receiving access to the sensitive data, the application may attempt to transmit data 716. For example, the application may send process data to a third party. In another example, the application may attempt to send a message generated by the user as a result of receiving user input indicating a location to transmit the message. The application may provide the data to be transmitted to an output device, such as a network interface, as described above. The mobile device may be configured to monitor a buffer associated with the output device to determine if the buffer includes tainted data 718. If the operation of the applications causes the sensitive data to be transmitted to the output device, the modified executable instructions may cause the taint data appended to or otherwise associated with the cloaked sensitive data to be transmitted to the output device as well. If the mobile device detects tainted data, the mobile device may cause an update to be transmitted to the privacy database 720. The update may indicate the application, the sensitive data, and the operation the application attempted to perform using the sensitive data. If the mobile device does not detect tainted data, the data may be transmitted by the output device 722 without updating the privacy database. In numerous variations to the process 700, if no tainted data is detected the mobile device may still update the privacy database. For example, the privacy database may maintain a history of operations of the application and if the history of operations indicates the application does not transmit the tainted data outside of the mobile device this may indicate a higher level of trust associated with the application.

Figure 8:
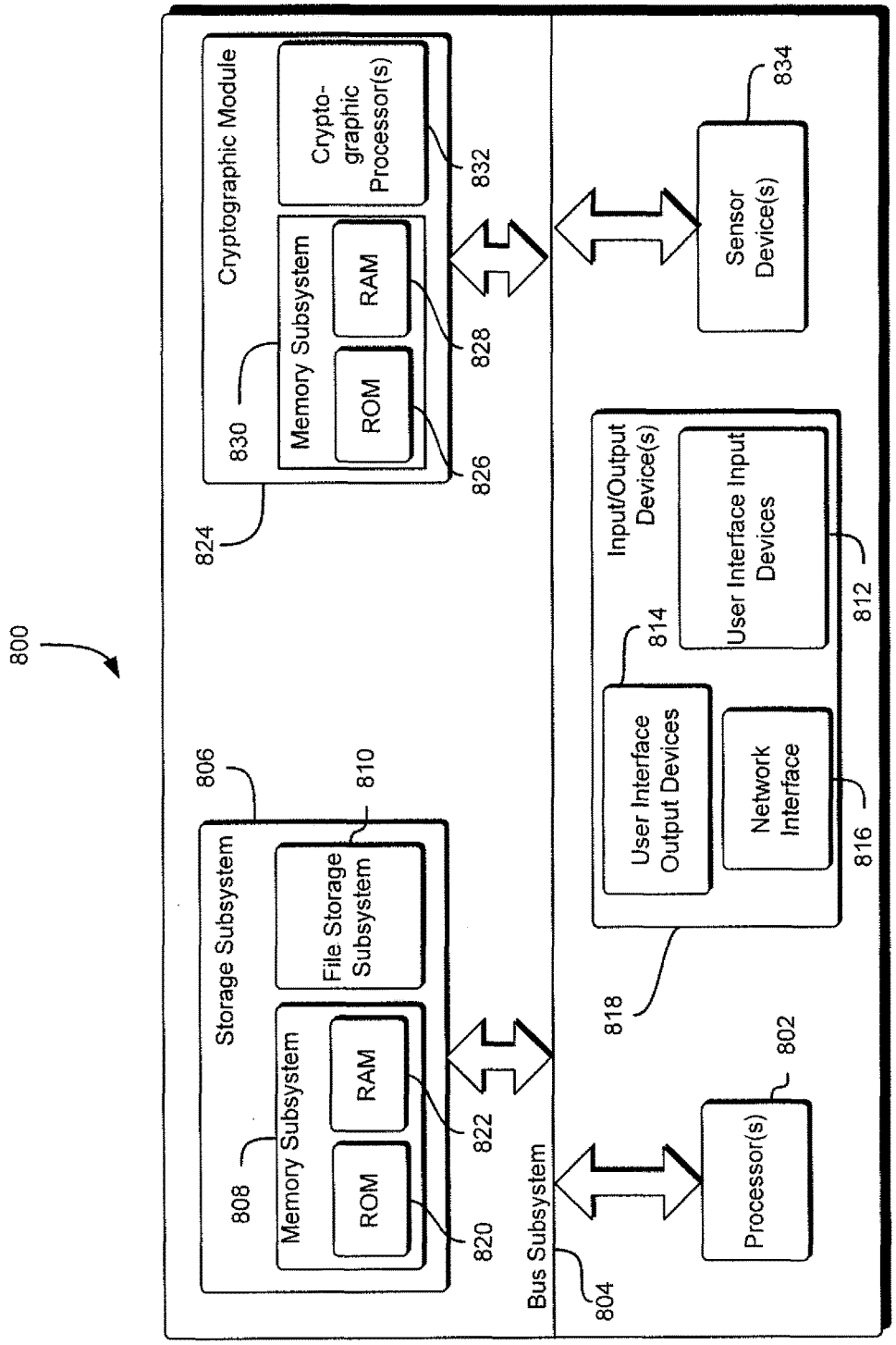
FIG. 8 shows an illustrative example of components of a computing device in accordance with at least one embodiment.

FIG. 8 is an illustrative, simplified block diagram of an example mobile device 800 that may be used to practice at least one embodiment of the present disclosure. In various embodiments, the device system 800 may be used to implement any of the systems illustrated herein and described above. For example, the device system 800 may be used to implement an mobile device and other applications, such as a browser application, in accordance with various embodiments. As shown in FIG. 8, the device 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more input/output devices 818 including, one or more user interface input devices 812, one or more user interface output devices 814, and a network interface subsystem 816, a cryptographic module 824, comprising a memory subsystem 830 and one or more cryptographic processors 832. The peripheral subsystems may also include one or more sensor devices 834 in addition to sensors of input devices 812. Such sensors may include, but are not limited to, GPS sensors, accelerometers, temperature sensors and others.

The bus subsystem 804 may provide a mechanism for enabling the various components and subsystems of device system 800 to communicate with each other as intended. Although the bus subsystem 804 is shown schematically as a single bus, alternative embodiments of the bus subsystem may utilize multiple busses.

The network interface subsystem 816 may provide an interface to other device systems and networks. The network interface subsystem 816 may serve as an interface for receiving data from and transmitting data to other systems from the device system 800. For example, the network interface subsystem 816 may enable transmission of application data and other information, such as electronic requests to access a system (e.g., receive a webpage) and may enable receipt of responses to the requests, such as webpages or other information. The network interface subsystem 816 may also facilitate the receipt and/or transmission of data on other networks, such as an organization's intranet and/or other networks described below.

The user interface input devices 812 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in consuming applications, as described above. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the device system 800.

User interface output devices 814, if any, may include a display subsystem, or non-visual displays, such as audio and/or tactile output devices, etc. Generally, the output devices 814 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device system 800. The output device(s) 814 may be used, for example, to present user interfaces to facilitate user interaction with applications performing processes described herein and variations therein, when such interaction may be appropriate. While a device 800 with user interface output devices is used for the purpose of illustration, it should be noted that the device 800 may operate without an output device, such as when the device 800 is operated in a server rack and, during typical operation, an output device is not needed.

The storage subsystem 806 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure, may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810. The memory subsystem 808 may include a main random access memory (RAM) 822 for storage of instructions and data during program execution and a read only memory (ROM) 820 for storing sensitive data.

The cryptographic module 824, which may be a trusted platform module (TPM), includes a memory subsystem 830, including a main random access memory (RAM) 828 for storage of instructions and data during program execution and a read only memory (ROM) 826, in which fixed cryptographic information may be stored, such as a hardware secret stored securely within the device 800 so as to be non-exportable (i.e., inaccessible through any call to the cryptographic module 824). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 800 may also store cryptographic keys in RAM 828 and/or processor registers for temporary cryptographic processing. The cryptographic information stored in memory may be used in combination with cryptographic information obtained via the network interface 816 and/or one or more of the user interface input devices 812. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the cryptographic module 824 may be configured to collectively perform various operations used generating cryptographically verifiable information for authentication objects.

As noted above, in various embodiments of the present disclosure, hardware secrets are securely stored within the cryptographic module 824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 9:
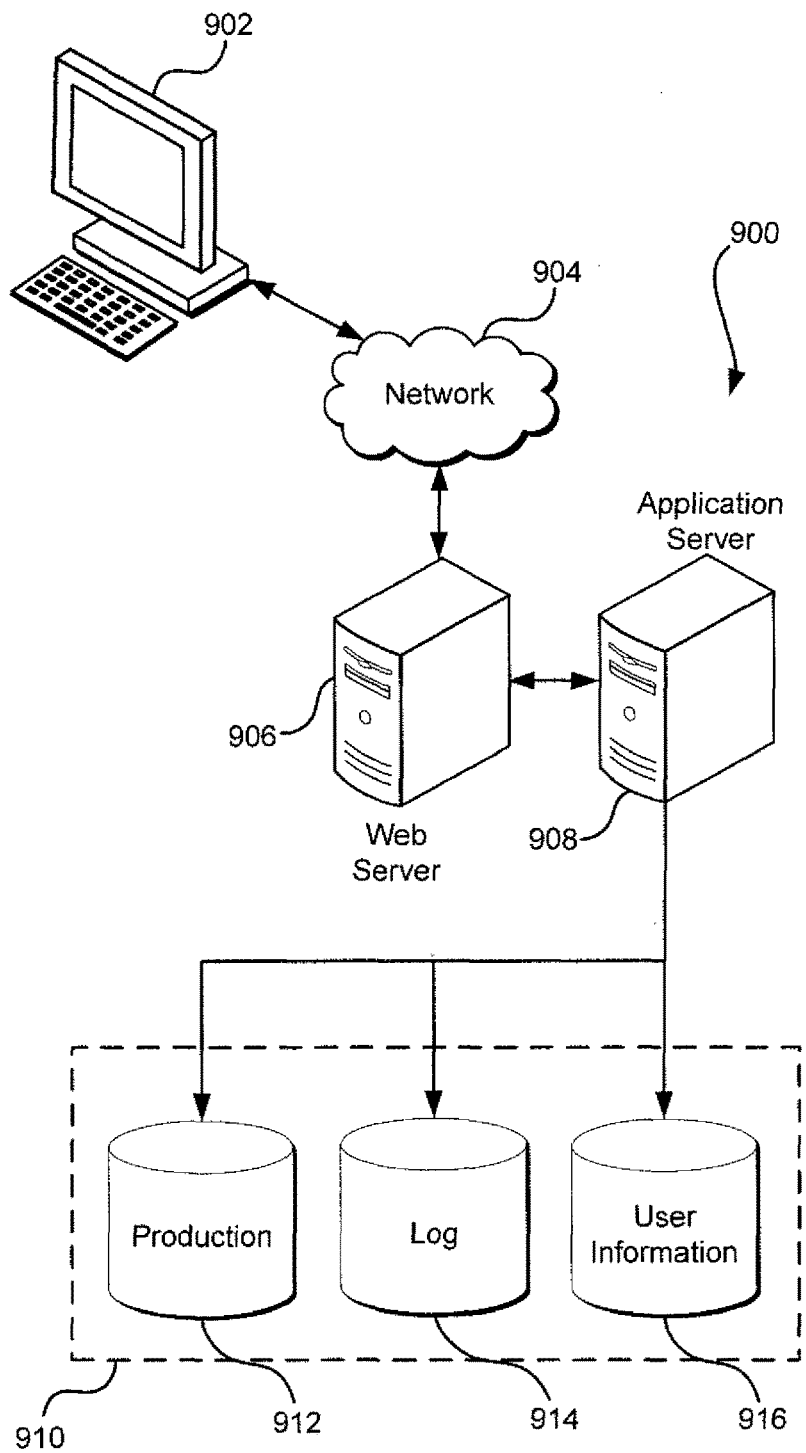
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving an application image corresponding to an application to be installed on a mobile device;
   modifying the application image to generate first modified instructions, wherein if executed, the first modified instructions cause the application to propagate taint data with cloaked sensitive data;
   granting a set of permissions to the application of the mobile device, the set of permissions enabling the application to access data marked as sensitive data by an operating system of the mobile device;
   calculating an approximation of the sensitive data in view of a cloaking level indicating an accuracy of the approximation, wherein the approximation of the sensitive data comprises a reduced fidelity version of the sensitive data corresponding to the accuracy, wherein the reduced fidelity version is useable by the application to perform an operation, and wherein the cloaking level corresponds to a trust level associated with the application indicated in a record stored in a database;
   generating first cloaked sensitive data comprising the approximation of the sensitive data;
   providing the first cloaked sensitive data to the application;
   detecting a transformation of the first cloaked sensitive data by the application;
   detecting, by a processing device, a transmission of first taint data and the first cloaked sensitive data by the application via a network, wherein the first taint data is propagated with the cloaked sensitive data as a result of execution of the first modified instructions of the application;
   aggregating a set of taint data from a plurality of mobile devices executing the application, wherein the set of taint data comprises the first taint data; and
   updating the trust level associated with the application indicated in the record stored in the database in view of the set of taint data and the transformation of the cloaked sensitive data by the application.

2. The computer-implemented method of claim 1, wherein providing the application with cloaked sensitive data further comprises:
   determining a cloaking level associated with the sensitive data, wherein the cloaking level indicates an accuracy of the approximation of the sensitive data used in generating the first cloaked sensitive data; and
   adjusting the cloaking level in response to transmission of the first cloaked sensitive data by the application.

3. The computer-implemented method of claim 1, further comprising:
   receiving from a service provider a description of the application comprising the trust level associated with the application; and
   providing a record associated with the application to the service provider.

4. A system comprising:
   one or more processors; and
   memory to store computer-executable instructions that, if executed by the one or more processors, cause the one or more processors to:
      receive an application image corresponding to an application to be installed on a mobile device;
      modify the application image to generate first modified instructions, wherein if executed, the first modified instructions cause the application to propagate taint data with cloaked sensitive data;
      receive a request to obtain sensitive data for use by the application;
      query a database to determine a trust level associated with the application;
      calculate an approximation of the sensitive data according to a cloaking level indicating an accuracy of the approximation, wherein the approximation comprises a reduced fidelity version of the sensitive data corresponding to the accuracy, wherein the reduced fidelity version of the sensitive data is useable by the application to perform an operation, and wherein the cloaking level corresponds to the trust level associated with the application;
      generate first cloaked sensitive data comprising the approximation of the sensitive data;
      associate taint data with the first cloaked sensitive data, which may be used by the application to perform an operation;
      detect a transformation of the first cloaked sensitive data by the application;

detect, by a processing device, a transmission of first taint data and the first cloaked sensitive data by the application via a network, wherein the first taint data is propagated with the cloaked sensitive data as a result of execution of the first modified instructions of the application;

aggregate a set of taint data from a plurality of mobile devices executing the application, wherein the set of taint data comprises the first taint data; and update the trust level associated with the application indicated in the record stored in the database in view of the set of taint data and the transformation of the cloaked sensitive data by the application.

5. The system of claim 4, the memory to store instructions that, if executed, cause the one or more processors to update the database to indicate utilization of the first cloaked sensitive data by the application, the database to store a history of operations performed by the application utilizing the first cloaked sensitive data.

6. The system of claim 5, the memory to store instructions that, if executed, cause the one or more processors to update the trust level by analyzing the history of operations performed by the application.

7. The system of claim 4, the memory to store instructions that, if executed, cause the one or more processors to receive a second update to the database from a service provider, the second update indicating at least an updated trust level associated with the application.

8. The system of claim 4, the memory to store instructions that, if executed, cause the one or more processors to:
receive the first cloaked sensitive data at an output device;
access the first taint data associated with the first cloaked sensitive data; and
update the database to identify the first taint data to indicate use of the first cloaked sensitive data by the application.

9. The system of claim 4, the memory to store instructions that, if executed, cause the one or more processors to:
copy the first cloaked sensitive data from a first data structure to a second data structure;
access first taint data associated with the first cloaked sensitive data stored in the first data structure; and
copy at least a portion of the first taint data to the second data structure, wherein the first cloaked sensitive data is associated with the first taint data in the second data structure.

10. The system of claim 4, the memory to store instructions that, if executed, cause the one or more processors to:
determine the application caused the first cloaked sensitive data to be modified; and
provide an update to the database indicating the first cloaked sensitive data has been modified.

11. A non-transitory computer-readable storage medium having stored thereon executable instructions that, if executed by one or more processors of a computer system, cause the one or more processors to:
receive an application image corresponding to an application to be installed on a mobile device;
modify the application image to generate first modified instructions, wherein if executed, the first modified instructions cause the application to propagate taint data with a reduced fidelity version of sensitive data;
receive, from the application, a request for the sensitive data;
determine a cloaking level indicating an accuracy of the reduced fidelity version of the sensitive data;
generate, according to the cloaking level, cloaked sensitive data comprising the reduced fidelity version of the sensitive data usable by the application to perform an operation;
detect a transformation of the cloaked sensitive data by the application;
detect, by a processing device, a transmission of first taint data and the cloaked sensitive data by the application via a network, wherein the first taint data is propagated with the cloaked sensitive data as a result of execution of the first modified instructions of the application;
aggregate a set of taint propagation data from a plurality of mobile devices executing the application, wherein the set of taint propagation data comprises the first taint data; and
update the trust level associated with the application indicated in the record stored in the database in view of the set of taint propagation data and the transformation of the cloaked sensitive data by the application.

12. The non-transitory computer-readable storage medium of claim 11, the one or more processors to provide the database with an identifier of the application executing the operation and one or more tags included in the first taint data associated with the cloaked sensitive data.

13. The non-transitory computer-readable storage medium of claim 11, the one or more processors to provide a set of least significant bits of sensitive data in response to the request for the sensitive data.

14. The non-transitory computer-readable storage medium of claim 11, the one or more processors to replace a set of coordinates comprised in the sensitive data with another set of coordinates within a certain radius of the set of coordinates.

15. The non-transitory computer-readable storage medium of claim 11, the one or more processors to detect transmission of the cloaked sensitive data to another application.

16. The non-transitory computer-readable storage medium of claim 11, the one or more processors to grant the application one or more permissions to access the sensitive data based at least in part on user input.

17. The non-transitory computer-readable storage medium of claim 16, the one or more processors to modify the trust level associated with the application in response to the update to the database.

18. The non-transitory computer-readable storage medium of claim 17, the one or more processors to revoke at least one of the one or more permissions granted to the application.

* * * * *